Figure 1:
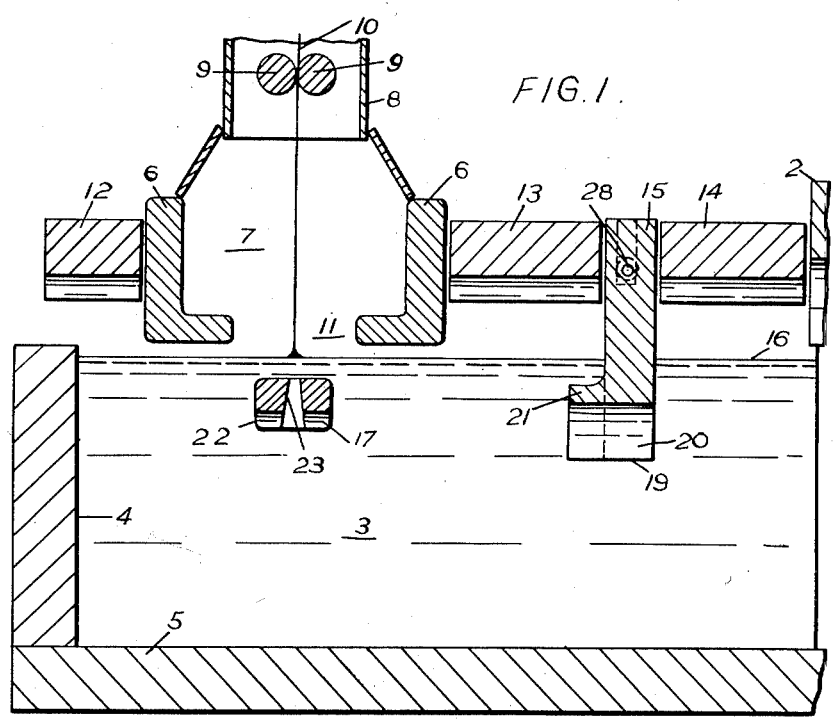

Inventor,
George William Terence Bird
By
Morrison, Kennedy & Campbell,
Attorneys.

United States Patent Office 2,772,516
Patented Dec. 4, 1956

2,772,516

METHODS OF AND APPARATUS FOR VERTICALLY DRAWING GLASS IN SHEET FORM

George W. T. Bird, St. Helens, England, assignor to Pilkington Brothers Limited, Liverpool, England, a British company Application January 3, 1951, Serial No. 204,248

Claims priority, application Great Britain January 13, 1950

9 Claims. (Cl. 49—17)

This invention relates to method of and apparatus for vertically drawing glass in sheet form and has for its main object the incorporation in the body of the sheet, of metal (that is, molten glass) of substantially uniform viscosity, so that the two faces thereof are composed of metal at substantially the same temperature, and so that a condition of strain in the sheet, conducive to warping or breakage, set up by differences of temperature in the faces of the sheet, or by differences between the temperatures of the faces of the sheet, is minimised.

The present invention consists in a method of regulating the flow of metal in a drawing kiln from which glass in sheet form is vertically drawn, characterised by obstructing the general flow of metal towards the line of draw, at a point remote therefrom and in a zone extending from one lateral boundary of the flow to the other and downwardly from the surface of the metal to a selected lower level of said metal having the same direction of flow as at the surface of said metal, a region of said zone intermediate said lateral boundaries extending downwardly to a depth less than the other regions of said zone, whereby to constrain a volume of metal to flow from said lower level towards said line of draw and medially of the kiln and to impart so said volume a kinetic energy ensuring that the whole of the metal which forms the sheet enters the drawing kiln about the centre line thereof and as a layer of shallow depth at the said lower level, whereby glass of the same viscosity is fed into both faces of the sheet being drawn.

The invention also consists in apparatus for carrying into effect the aforesaid methods of regulating the flow in a drawing kiln, which is characterised by an arch formed medially in the under side of a member extending across the width of the kiln, said member projecting above the surface of the metal for the width of the kiln and being immersed in the metal to the aforesaid lower level, the arch being formed to direct the flow of metal passing therethrough medially of the kiln in the vicinity of the draw line.

As applied to the drawing kiln in the form of an extension to a melting tank from which kiln glass is drawn vertically, whether the glass is annealed either in a tower or when disposed in a horizontal plane, the immersed member may be constituted as a shut-off, that is to say may extend above the surface of the metal in the kiln for an extent to cut off the atmosphere of the melting tank from the drawing kiln, or may be constituted by a bar disposed beneath the shut-off as a downward extension thereof whether integral therewith or located thereunder.

Since metal flowing in contact with the wall of the arch may become contaminated by reaction with the material of which the arch or the shut-off is made, this contiguous metal is directed upwardly and away from the relatively fast flow of metal emerging from the arch and moving forwardly towards the line of draw, by extending the defining wall of the arch towards the line of draw so far forwardly of the member in which the arch is incorporated as to form a ridge on the forward face of the member which in plan view is at least as long as the inside width of the arch.

Instead of forming the arch in a combined shut-off and skim-bar, the arch may be formed in a skim-bar disposed between a normal shut-off and the line of draw in known manner; in such embodiment of the invention the bottom of the skim-bar extends downwardly into the metal to a level being below the level from which metal is taken to supply the glass required at the draw line, i. e., below the level of the underface of a normal draw-bar.

The cross-sectional area of the arch is preferably such as to permit a flow of a volume of metal (which does not come into contact with the shut-off or skim-bar) sufficient to compensate for metal taken up in the sheet, thereby the flow to the line of draw becomes and is maintained demarked, and metal in the kiln which has not passed through the arch to enter the kiln is not drawn into the sheet.

Accordingly a method of regulating the flow of metal to the line of draw according to the invention may also be characterised by regulating the volume of metal to which kinetic energy is imparted so that that part which has not been liable to contamination is at least as great as the volume of metal taken up by the sheet being formed.

In one practical embodiment of the invention as applied to the drawing extension to a melting tank from which glass is drawn vertically as a continuous sheet through an annealing tower, the shut-off is formed with an arch. The shut-off is disposed at a convenient distance from the draw-bar, and as it depends into the metal in the extension, a skim-bar between the shut-off and draw-bar is not necessary.

Figure 2:
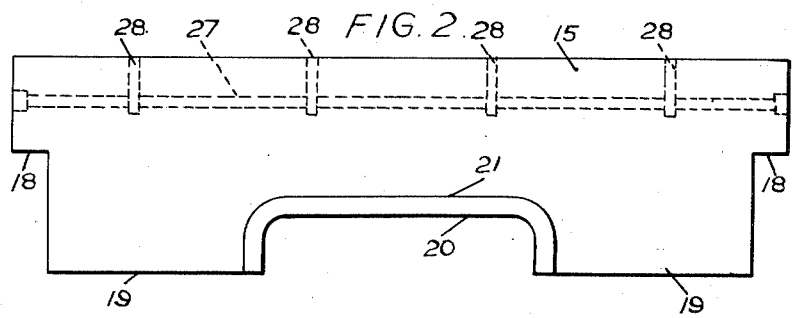
Figure 3:
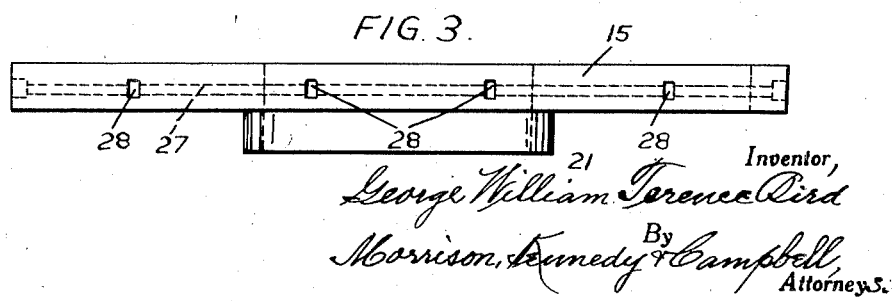
Figure 4:
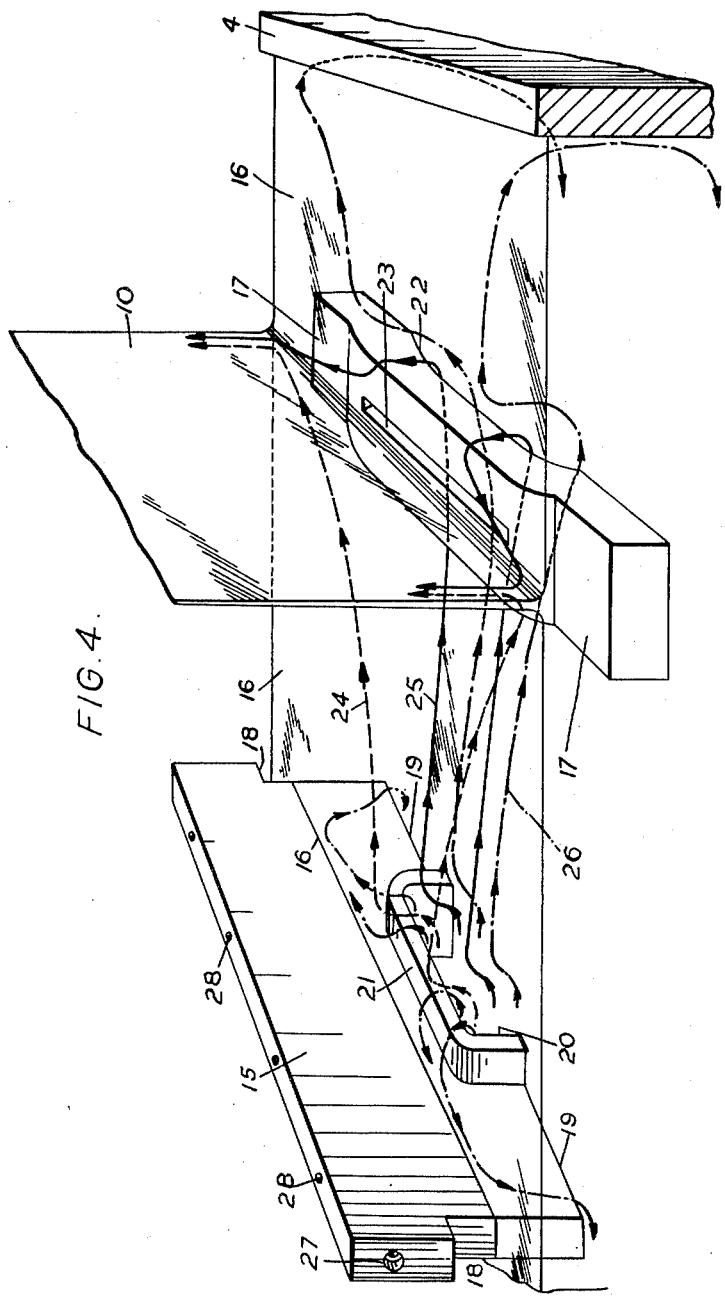

In order that the invention may be more clearly understood, a preferred embodiment thereof will now be described by way of example with reference to the accompanying drawings in which:

Fig. 1 is a diagrammatic sectional elevation longitudinally of a drawing kiln formed as an extension to a glass melting tank, and of the lower part of the superposed lehr through which the glass is vertically drawn, Fig. 2 is a front elevation of an arched shut-off, Fig. 3 is a plan view of the shut-off shown in Fig. 2, and Fig. 4 is a diagrammatic perspective view of the shut-off and draw-bar, showing the direction of flow of the metal.

In the drawings the drawing end of the glass melting tank is indicated at 1, and the roof thereof at 2; the extension to the tank is indicated at 3, the end wall of the extension at 4 and the hearth of the extension at 5. The usual shield 6—6 of L section defines an entrance chamber 7 to the lehr indicated at 8, in which a series of roller pairs, one only of which is shown at 9, continuously draw up a glass sheet 10 as it is formed through the mouth 11 of the entrance chamber 7 into the lehr at the top of which it is cut into sections in well known manner. At 12, 13 and 14 are indicated the usual front, curtain and rear, roof elements respectively over the extension, and at 15 is shown a gate disposed in remote relation to the draw-line and which functions in well-known manner to shut off from the extension flue gases from the melting tank, and prevent the gases reaching the surface area of the glass from which the sheet 10 is drawn.

The general level of the metal, or molten glass, is indicated at 16, and a submerged draw-bar 17 is located beneath the line of draw of the glass.

As will be seen more clearly from Fig. 2, the ends of the shut-off 15 are formed with shoulders 18 for resting on the side walls of the drawing kiln. The bottom edge 19 of the shut-off depends into the metal to a level below that of the under face of the draw-bar 17, and is formed with an arch 20 intermediate the ends of the shut-off. The arch is shown as symmetrically disposed about the centre line of the shut-off and hence about the medial line of the kiln, but it may be disposed asymmetrically but so as to include such medial line.

The arch is formed with a surrounding ridge 21 extending forwardly of the shut-off towards the draw-bar.

The bottom of the shut-off depends into the metal to a level below the level of the underface of the draw-bar, the arch formed in the shut-off may have vertical side walls whilst the top of the arch is a horizontal wall, these three arch defining walls preferably extend forwardly of the shut-off forward face to form an ambient ridge. The ridge thus formed permits the metal which has been separated from the metal feeding the sheet to be evacuated from the extension to the tank by dispersing laterally towards each wall of the extension under the vertical wall and back into the melting tank. The width of the arch is about a third of the width of the extension, and the height is such as to produce a volume of relatively fast moving metal in compensation for the volume of metal taken up by the sheet moving up into the tower. In such a construction the ridge may have either a horizontal upper face or a sloping upper face.

As will be seen more clearly from Fig. 4, the draw-bar 17 is curved so as to form a shallow arch 22 on its under face, extending to each side of the medial line of the drawing kiln so as to enclose the relatively fast moving metal passing under the draw-bar. The draw-bar is also formed with an upwardly tapering transverse slot 23.

The flow paths of the molten glass through the drawing kiln are indicated in Fig. 4, and as the flow through the slot 23 is negligible this has been omitted from the drawing for the sake of clarity. In Fig. 4 the flow path of the glass forming the rear face of the sheet is shown in broken lines 24, and that of the glass forming the front face of the sheet is shown in continuous lines 25. The flow path of the glass which does not form part of the sheet but returns to the melting tank is shown in chain lines 26. From this figure it will be seen that the whole of the glass forming the sheet is derived from a shallow layer passing through the arch 20 at a level below the inside top wall of the arch. The glass which comes in contact with the inside of the top wall of the arch is caused to flow back over the ridge 21 and then under the bottom edge 19 of the shut-off as indicated by the said chain lines 26, back to the melting tank. The glass which comes into contact with the side walls of the arch is caused to diverge, and to pass by each side of the metal flowing to the sheet being drawn, by reason of the concentrated flow along the medial line.

With a view to controlling the disposition of the line of symmetry of the volume of uncontaminated metal leaving the arch and moving towards the line of draw, the arch may be extended rearwardly of the shut-off or other arched member to an extent which is sufficient to achieve such control.

The lateral passage 27 and the communicating vertical slots 28 are formed in the shut-off 15 to facilitate lifting thereof. When it is desired to lift or move the shut-off, hooked rods are inserted, hooks downwards, in slots 28 and a rod is passed into passage 27 so as to pass through the hooks. The hooked rods have eyes at their upper ends so that lifting gear may be readily attached. When the cut-off has been moved to the desired position, the lateral and hooked rods are removed.

Instead of employing a rectangular arch, the arch may be of shallow elliptical form, and a ridge formed above the crown of the arch may extend somewhat beyond each side thereof so as to have a length at least as great as the internal width of the arch, alternatively, where the defining walls of the arch terminate in front of the bar so as to form a surrounding ridge thereon as already described the ridge may be extended horizontally and laterally from the bottom of the arch for a short distance away therefrom.

By the present invention, metal of practically uniform temperature and viscosity is distributed across the body of the sheet and losses due to warping or breakage during annealing minimised, whilst good quality glass free from seeds or foreign particles or "music lines" (such as are produced if the metal at the surface and in contact with a shut-off or skim-bar flows into the line of draw) may be continually produced.

I claim:

1. A method of regulating the flow of metal in a drawing kiln from which glass in sheet form is vertically drawn, characterised by obstructing the general flow of metal towards the line of draw, at a point remote therefrom and in a zone extending from one lateral boundary of the flow to the other and downwardly from the surface of the metal to a selected lower level of said metal having the same direction of flow as at the surface of said metal, an intermediate region of said zone spaced from said lateral boundaries extending downwardly to a depth less than the other regions of said zone, whereby to constrain a volume of metal to flow from said lower level towards said line of draw and medially of the kiln and to impart to said volume a kinetic energy ensuring that the whole of the metal which forms the sheet enters the drawing kiln about the centre line thereof and as a layer of shallow depth at said lower level, whereby glass of the same viscosity is fed into both faces of the sheet being drawn.

2. A method of regulating the flow of metal in a drawing kiln from which glass in sheet form is vertically drawn, characterised by obstructing the general flow of metal towards the line of draw, at a point remote therefrom and in a zone extending from one lateral boundary of the flow to the other and downwardly from the surface of the metal to a selected lower level of said metal having the same direction of flow as at the surface of said metal, an intermediate region of said zone spaced from said lateral boundaries extending downwardly to a depth less than the other regions of the zone; and positively directing the flow of metal in the intermediate region of the zone towards said line of draw, whereby to constrain a volume of metal to flow from said lower level towards the line of draw and medially of the kiln with a rate of flow ensuring that the whole of the metal which forms the sheet enters the drawing kiln about the centre line thereof and as a layer of shallow depth at the said lower level, so that glass of the same viscosity is fed into both faces of the sheet being drawn.

3. Apparatus for regulating the flow of metal in a drawing kiln from which glass in sheet form is vertically drawn characterised by an obstructing member remote from the line of draw extending across the width of said kiln between the supply of the metal and the line of draw and extending downwardly from the surface of the metal to a selected lower level having the same direction of flow as at the surface, the underside of said obstructing member being arched in a region spaced from and intermediate its ends to direct the flow of metal passing therethrough medially of the kiln in the vicinity of the draw line.

4. Apparatus for regulating the flow of metal in a drawing kiln from which glass in sheet form is vertically drawn characterised by an obstructing member remote from the line of draw extending across the width of said kiln between the supply of the metal to the kiln and the line of draw and from a selected level beneath the surface of the metal at which the direction of flow is the same as at the surface to a height above said surface to cut off the atmosphere of the melting tank from the drawing kiln, the underside of said obstructing member being arched intermediate its ends in a region spaced from and to direct the flow of metal passing therethrough medially of the kiln in the vicinity of said draw line.

5. Apparatus for vertically drawing glass in sheet form comprising a melting tank, a drawing kiln communicating with said tank and an obstructing member remote from the line of draw extending across the width of said kiln between the line of draw and said melting tank and from a selected level beneath the surface of the metal at which the direction of flow is the same as at the surface to a height above said surface to cut off the atmosphere of said melting tank from said kiln, the underside of said obstructing member being arched in a region spaced from and intermediate its ends to direct the flow of metal passing therethrough medially of the kiln in the vicinity of said draw line.

6. Apparatus for vertically drawing glass in sheet form comprising a melting tank, a drawing kiln communicating with said tank, an obstructing member remote from the line of draw extending across the width of said kiln between the line of draw and said melting tank and from a level beneath the surface of the metal at which the direction of flow is the same as at the surface to a height above said surface to cut off the atmosphere of said melting tank from said kiln, the underside of said obstructing member being arched intermediate its ends to direct the flow of metal passing therethrough medially of the kiln in the vicinity of said draw line, and the defining walls of the arch of said obstructing member being extended forwardly from the forward face of the member to form a ridge along the profile of the arch, said ridge being in plan view at least as long as the inside width of the arch, whereby metal flowing in contiguity with the defining wall of the arch is vertically separated from the metal flowing towards the line of draw.

7. In an apparatus for vertically drawing glass in sheet form including a belting tank and a drawing kiln communicating with said tank, an obstructing member remote from the line of draw extending across the width of said kiln between the line of draw and said melting tank and from a selected level beneath the surface of the metal at which said metal has the same direction of flow as at the surface of said metal, to a height above said surface to cut off the atmosphere of said melting tank from said kiln, the underside of said obstructing member being arched in a region spaced from and intermediate its ends, whereby the metal flowing through said arch is directed medially of said kiln and has such kinetic energy as to cause only the metal flowing through said arch to reach the draw line and to be incorporated in the glass sheet drawn at such line.

8. An obstructing wall member adapted to extend across a glass drawing kiln for use therein as a shut-off to cut off the atmosphere from a melting tank characterized in that the depth of that part thereof intended to be submerged comprises an opening arched intermediate its ends to the bottom edge of the wall member and a ridge on the face of the wall member intended to be disposed towards the draw line closely surrounding said arched opening.

9. Apparatus for regulating the flow of metal in a drawing kiln from which glass in sheet form is vertically drawn, characterized by an obstructing member, remote from the line of draw extending across the width of said kiln between the supply of the metal and the line of draw and extending downwardly from the surface of the metal to a selected lower level of said metal having the same general direction of flow as at the surface of said metal, the underside of said obstructing member being arched in a region spaced from and intermediate its ends to direct the flow of metal passing therethrough medially of the kiln in the vicinity of the draw line, and the defining walls of the arch of said obstructing member being extended forwardly from the forward face of the member to form a ridge along the profile of the arch, said ridge being in plan view at least as long as the inside width of the arch, whereby metal flowing in contiguity with the defining wall of the arch is vertically separated from the metal flowing towards the line of draw.

References Cited in the file of this patent

UNITED STATES PATENTS

| | | |
|---|---|---|
| 837,821 | Fourcault | Dec. 4, 1906 |
| 876,267 | Colburn et al. | Jan. 7, 1908 |
| 1,615,841 | Hitner | Feb. 1, 1927 |
| 1,805,218 | Mambourg | May 12, 1931 |
| 1,920,692 | Halbach | Aug. 1, 1933 |
| 1,956,170 | Gregorius | Apr. 24, 1934 |
| 2,291,348 | Schaulin | July 28, 1942 |
| 2,384,073 | Campbell | Sept. 4, 1945 |